United States Patent Office 2,907,655

Patented Oct. 6, 1959

2,907,655

LIGHT-SENSITIVE MATERIAL FOR THE PHOTOMECHANICAL REPRODUCTION AND PROCESS FOR THE PRODUCTION OF IMAGES

Maximilian Paul Schmidt and Oskar Süs, Wiesbaden-Biebrich, Germany

No Drawing. Application September 30, 1953
Serial No. 383,408

17 Claims. (Cl. 96—33)

The present invention relates to the field of photomechanical reproduction. More particularly it relates to light-sensitive material for use in photomechanical reproduction, wherein amide-like derivatives of sulfonic acids of ortho-quinone-diazides, are used as the light-sensitive substance, and to the process of making printing plates from light-sensitive material consisting of a base and a light-sensitive layer containing said light-sensitive substances.

Light-sensitive material for duplication by means of photomechanical processes has recently come into wide commercial usage. Such material includes a support carrying a light-sensitive coating, the support being usually a metal sheet, and preferably an aluminum sheet. It has previously been the practice to employ in the light-sensitive coating, a colloid layer which was prepared by embedding finely divided light-sensitive substances into a colloid material. Such colloid layers harden under the influence of light-rays and usually impart oleophilic properties to those areas which are light exposed. It has recently been proposed to use a light-sensitive material free from such colloid components and employing light-sensitive substances solely. Since the above referred to method for the reproduction of copies usually involves a printing process in which greasy ink is used, it is necessary to use only such light-sensitive substances for the formation of the light-sensitive coating which initially, or after exposure to actinic light, accept greasy ink.

We have now found that certain amide-like derivatives of sulfonic acids of the ortho-quinone diazides, when employed in the light-sensitive coating, enable the reproduction of numerous copies by the afore-mentioned method, with excellent results.

It is an object of this invention, therefore, to provide a light-sensitive material for photomechanical reproduction. Another object is to provide printing plates comprising a support and a light-sensitive layer, wherein the layer consists essentially of amide-like derivatives of sulfonic acids of the ortho-quinone-diazides. Other objects and advantages of this invention will become apparent from a reading of the description following hereinafter.

The light-sensitive material to be used in accordance with this invention as light-sensitive substances are water-insoluble compounds corresponding to the general formula:

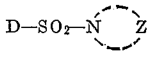

wherein D stands for an ortho-quinone-diazide residue, and N is a ring member in a heterocyclic system supplemented by Z so as to form a ring, and in which N is directly linked to at least one further ring-nitrogen atom.

Among the heterocyclic ring systems which contain a residue corresponding to the above indicated general formula are, e.g. the pyrazole bodies and the triazole bodies. By having the hydrogen atom linked to one of the ring nitrogen atoms by the sulfonyl residue —$SO_2$—D in the said bodies, light-sensitive compounds are obtained which are suited for the purpose of the present invention. The compounds corresponding to the above general formula in which the residue

may be substituted, are prepared, for example, by causing pyrazoles, indazoles, triazoles or benzotriazoles to react with o-quinone-diazide-sulfonic acid chlorides.

The light-sensitive material is made by producing a layer containing the compounds corresponding to the present invention on a suitable support. The light-sensitive coating is produced by applying a solution of the light-sensitive compounds onto the support, for instance by spreading, spraying or whirlcoating, or, if desired, the solution may also be applied to the support by means of rollers. Metals, such as aluminum or zinc foils or plates, are especially suitable as supports. The layer applied onto the support is well dried. By the use of the light-sources customary in photographic tracing and in printing offices, an image from a transparent pattern is produced on the light-sensitive material. The image is then transposed into a final image by treating the exposed side of the foil with weak alkaline aqueous solutions, preferably those of secondary or tertiary alkali metal salts of phosphoric acid, e.g. disodium phosphate, trisodium phosphate, etc., and thereafter with acid reacting substances. Alkaline solutions having a pH value of at least 9 have given good results. Hereinafter when the term "acid reacting substances" is used, it is intended to include solutions containing acids and/or acid salts. In the exposed areas the light-reaction product of the light-sensitive substance is removed by the alkaline treatment, while the light-sensitive compound remains in the areas not hit by light. Since the light-sensitive substance is initially oleophilic, and consequently capable of accepting greasy ink, a positive image is obtained from a positive pattern, and if a metal plate or a metal foil is used as a support, the image carrying support is suitable to be used as a printing plate. Hereinafter, when the term "imaged areas" is used it is intended to refer to those areas not struck by light, which are not dissolved by the alkaline solution and which are oleophilic.

If it is desired to use the material of the invention for cliches, or for the production of stencils, the image carrying support obtained above would be subjected to further treatment with etching media in the former instance and would be stamped in the latter instance.

The light-sensitive compounds according to the above mentioned general formula may be obtained, for example, by causing ortho-quinone-diazide-sulfonic chlorides to react with pyrazole or triazole bodies. Their solubility in organic solvents makes them very fit for coating suitable supports, e.g. metal plates.

The light-sensitive compounds of the invention, when applied onto the support in the form of a solution in an organic solvent, form a uniform coating on the support. Due to their insolubility in cold water, the coatings produced on the support are not sensitive to the humidity of the air, which favors the storage stability of the light-sensitive material. To prepare the solutions needed for coating, preferably such organic solvents are chosen which are of good volatility, as for example alcohols, alcoholic ethers, and other solvents, such as dioxane and benzene, are suitable.

In order to avoid segregation of crystals in the coating, it may be advantageous sometimes to add crystallization inhibiting agents, e.g. alkali soluble resins, to the sensitizing solutions, or to use mixtures of several of the compounds for the preparation of the sensitizing solutions.

The following examples are inserted for the purpose of illustrating the present invention, and it is not intended to thereby restrict the scope of the invention to the contents of the examples. Where not otherwise stated, the parts are by weight.

EXAMPLES

*Example 1*

A paper printing foil which is provided on one side with a layer produced from casein and aluminum silicate and hardened with formaldehyde (see U.S. Patent No. 2,534,588) is coated on top of the casein layer with a 1% solution of the compound corresponding to Formula 1:

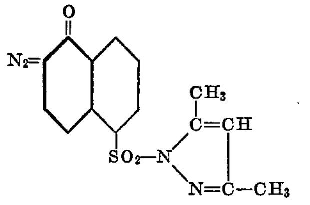

in glycol-monomethyl ether. The light-sensitive surface of the carefully dried foil is exposed to light under a pattern, developed with a 1% disodium phosphate solution and then subjected to a short treatment with a solution of highly diluted phosphoric acid (about 0.1%), which contains also primary ammonium phosphate, ammonium nitrate, nickel nitrate and glycerine. A yellow-colored, distinctly visible image on an almost white background is obtained which can be inked with greasy ink and may be used for the production of copies in a printing machine.

An equally good result is obtained when using as the light-sensitive substance the compound corresponding to Formula 2:

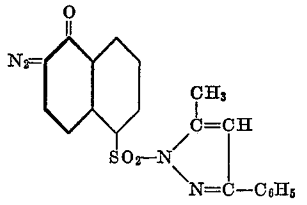

The image obtained from a transparent pattern is developed with a 5% disodium phosphate solution.

The compound corresponding to Formula 1 is obtained by causing 1.1 moles of naphthoquinone-(1,2)-diazide-(2)-5-sulfo chloride to react with 1 mol of 3,5-dimethyl-pyrazole in dioxane, in the presence of 1.1 moles of a 1n-caustic soda solution. The 1-[naphthoquinone-(1′,2′)-diazide - (2′) - 5′ - sulfonyl] - 3,5 - dimethyl - pyrazole crystallizes and is purified by digestion with a highly diluted caustic soda solution. The decomposition point is 146° C.

The 1 - N - [naphthoquinone - (1′,2′) - diazide - (2′)-5-sulfonyl]-3-phenyl-5-methyl-pyrazole (Formula 2) is prepared by condensing, in an analogous manner, naphthoquinone - (1,2) - diazide - (2) - 5 - sulfo - chloride with 3-phenyl-5-methyl-pyrazole (melting point 126° C.). The reaction product can be recrystallized from aqueous methanol. When heated in a capillary tube, it turns red at 125° C. and decomposes at 146° C.

*Example 2*

A 1.5% solution of the condensation product of 6-nitro-indazole (melting point 181° C.) and naphthoquinone-(1,2)-diazide-(2)-4-sulfochloride, Formula 3:

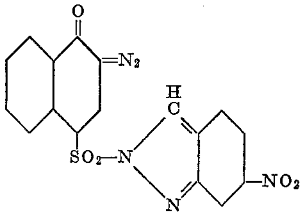

or

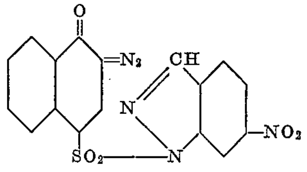

in glycolmonomethyl ether is coated as a thin layer onto a mechanically roughened aluminum foil. The dried layer is exposed to the light of an arc lamp under a positive pattern and then developed with a 3% trisodium phosphate solution. A positive image is obtained which, after being wiped over with dilute acid, becomes excellently receptive to greasy ink. After the image is inked with greasy ink, it can be used as a printing plate or be transformed into a pattern.

In order to prepare the above described condensation product (Formula 3), 1.35 parts of 6-nitro-indazole and 2.7 parts of naphthoquinone-(1,2)-diazide-(2)-4-sulfochloride are dissolved in 22 parts by volume of dioxane. To this solution, first 5 parts by volume of water are added, and then, while the temperature is raised up to about 40° to 50° C., 12 parts by volume of a 10% soda solution are added gradually. The reaction mixture is subsequently kept at a temperature of 40°–50° C. for another quarter of an hour and then added to 150 parts by volume of water. At the same time soda is added in such quantities so as to render the liquid clearly alkaline. A solid, yellow product separates, the chemical constitution of which supposedly corresponds to Formula 3. It is purified by dissolving it in alcohol (in which it is rather difficultly soluble) and precipitated with water. The yellow compound is readily soluble in acetone and chloroform and almost insoluble in gasoline. At a temperature above 200° C. the compound changes to a darker color and decomposes slowly at 230° to 240° C.

Results similar to those obtained with the compound according to Formula 3 are obtained when a 2% solution of the compound corresponding to Formula 4

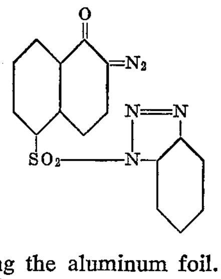

is used for coating the aluminum foil. To prepare the compound according to Formula 4, 5.4 parts of naphthoquinone-(1,2)-diazide-(2)-5-sulfochloride are dissolved in 50 parts by volume of dioxane; 2.4 parts of benztriazole, dissolved in some dioxane, are added, and the reaction mixture is then mixed with as much of a 10% soda solution so as to render the mixture alkaline. When the reaction mixture is poured into water, the reaction product according to Formula 4 precipitates. It is subsequently filtered by suction, carefully washed with water and recrystallized from ethyl alcohol. The melting and decomposition point is at 172° C.

*Example 3*

A mechanically roughened aluminum foil is coated with a 1% solution of the compound corresponding to Formula 5

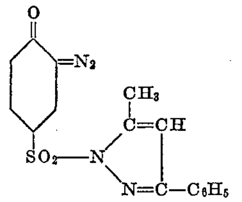

in glycol-monomethyl ether. After the dried foil has been exposed to light under a positive pattern and developed with a 5% disodium phosphate solution, a positive image of the pattern is obtained, which, after treatment with an acid medium, e.g. with a solution of mono-ammonium phosphate, may be inked with greasy ink. For the development of the exposed foil a 1% solution of trisodium phosphate may also be used.

In order to prepare the compound corresponding to Formula 5, benzoquinone-(1,2)-diazide-(2)-4-sulfochloride is caused to react with an equimolecular quantity of 3-phenyl-5-methyl-pyrazole in dioxane with the addition of pyridine. In order to separate the reaction product, the solvent is evaporated under reduced pressure and the remaining syrupy mass is thoroughly stirred up with dilute hydrochloric acid, until a yellow powder is formed. After recrystallization from ethyl alcohol, the 1-[benzoquinone-(1′,2′) - diazide - (2′) - 4′ - sulfonyl] - 3 phenyl - 5-methyl-pyrazole, is heated in a capillary tube and decomposes at 140° C., after having previously turned red.

*Example 4*

A mechanically roughened aluminum foil is coated with a 1% solution of a compound corresponding to Formula 6

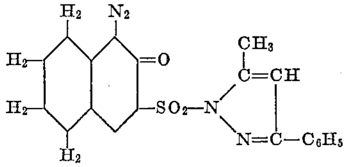

in glycol-monomethyl ether. The well dried sensitized foil is then exposed under a master for the photomechanical production of an image. The image is developed with a 1–5% solution of trisodium phosphate and then wiped over with a 1% phosphoric acid solution. After being inked with greasy ink, it is available as a printing plate.

The compound corresponding to Formula 6 is prepared by reaction of 5,6,7,8-tetra-hydro-naphthoquinone-(1,2)-diazide-(1)-3-sulfochloride with 3-phenyl-5-methyl-pyrazole. When heated in a capillary tube, the reaction product sinters at 85° C. and begins to decompose at 95° C.

Having thus described our invention, what we desire to claim is:

1. An article for use in the manufacture of printing plates comprising a base and a light-sensitive layer coated on said base adapted to being converted into imaged and non-imaged areas, said layer including at least one compound conforming to the formula:

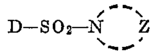

wherein D stands for an ortho-quinone-diazide radical, and N is a ring member in a five membered heterocyclic system supplemented by Z so as to form a ring, in which N is directly linked to at least one further ring nitrogen atom.

2. The article of claim 1 wherein the atoms differing from carbon in the radical

are nitrogenous and this radical is selected from the group consisting of those five membered heterocyclic ring compounds differing from carbon in two and in three atoms.

3. The article of claim 1 wherein the radical

stands for the radical of a pyrazole body.

4. The article of claim 1 wherein the radical

stands for the radical of a triazole body.

5. An article for use in the manufacture of printing plates comprising a base and a light-sensitive layer coated on said base adapted to being converted into imaged and non-imaged areas, said layer containing

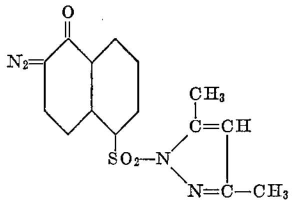

6. An article for use in the manufacture of printing plates comprising a base and a light-sensitive layer coated on said base adapted to being converted into imaged and non-imaged areas, said layer containing

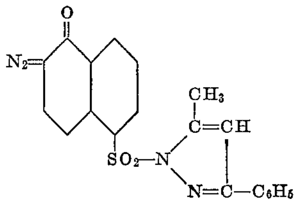

7. An article for use in the manufacture of printing plates comprising a base and a light-sensitive layer coated on said base adapted to being converted into imaged and non-imaged areas, said layer containing the condensation product of 6-nitro-indazole and naphthoquinone-(1,2)-diazide-(2)-4-sulfochloride.

8. An article for use in the manufacture of printing plates comprising a base and a light-sensitive layer coated on said base adapted to being converted into imaged and non-imaged areas, said layer containing

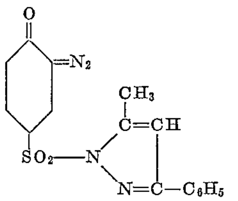

9. An article for use in the manufacture of printing plates comprising a base and a light-sensitive layer coated on said base adapted to being converted into imaged and non-imaged areas, said layer containing

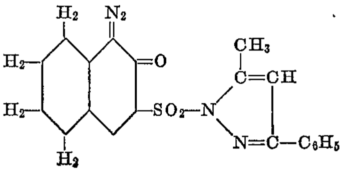

10. The process for forming plates for use in photomechanical reproduction comprising the steps of coating a base with a light-sensitive layer including at least one compound conforming to the formula

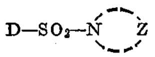

wherein D stands for an ortho-quinone-diazide radical, N is a ring member in a five membered heterocyclic system supplemented by Z so as to form a ring, in which N is directly linked to at least one further ring nitrogen atom, exposing said light sensitive layer to light under a pattern to decompose said compound in the light struck areas and treating the exposed layer with a dilute alkaline solution to remove the decomposed compounds.

11. The process of claim 10 wherein the developed plate is thereafter treated with a solution containing an acid reacting substance.

12. The process of claim 10 wherein the alkaline solution is selected from the group consisting of secondary and tertiary alkali metal salts of phosphoric acid.

13. The process for forming plates for use in photomechanical reproduction comprising the steps of coating a base with a light-sensitive layer containing

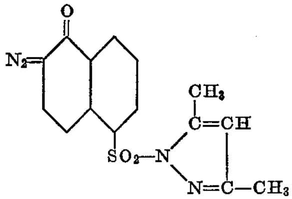

exposing said light-sensitive layer to light under a pattern to decompose said compound in the light-struck areas and treating the exposed layer with a dilute alkaline solution to remove the decomposed compound.

14. The process for forming plates for use in photomechanical reproduction comprising the steps of coating a base with a light-sensitive layer containing

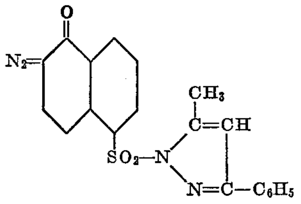

exposing said light-sensitive layer to light under a pattern to decompose said compound in the light-struck areas and treating the exposed layer with a dilute alkaline solution to remove the decomposed compound.

15. The process for forming plates for use in photomechanical reproduction comprising the steps of coating a base with a light-sensitive layer containing the condensation product of 6-nitro-indazole and naphthoquinone-(1,2)-diazide-(2)-4-sulfochloride, exposing said light-sensitive layer to light under a pattern to decompose said compound in the light struck areas and treating the exposed layer with a dilute alkaline solution to remove the decomposed compound.

16. The process for forming plates for use in photomechanical reproduction comprising the steps of coating a base with a light-sensitive layer containing

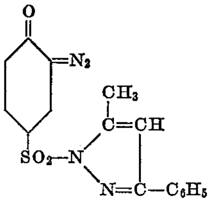

exposing said light-sensitive layer to light under a pattern to decompose said compound in the light struck areas and treating the exposed layer with a dilute alkaline solution to remove the decomposed compound.

17. The process for forming plates for use in photomechanical reproduction comprising the steps of coating a base with a light-sensitive layer containing

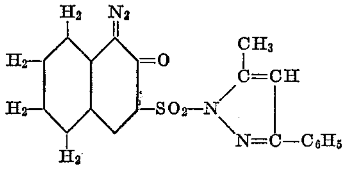

exposing said light sensitive layer to light under a pattern to decompose said compound in the light struck areas and treating the exposed layer with a dilute alkaline solution to remove the decomposed compound.

References Cited in the file of this patent

FOREIGN PATENTS

| | | |
|---|---|---|
| 497,135 | Belgium | Nov. 16, 1950 |
| 500,222 | Belgium | Jan. 15, 1951 |